United States Patent [19]

Itagaki et al.

[11] Patent Number: 4,808,683

[45] Date of Patent: Feb. 28, 1989

[54] VINYLAMINE COPOLYMER, FLOCCULATING AGENT USING THE SAME, AND PROCESS FOR PREPARING THE SAME

[75] Inventors: Takaharu Itagaki, Yokohama; Mitsuaki Shiraga, Machida; Shigeru Sawayama, Yokohama; Kohichi Satoh, Zama, all of Japan

[73] Assignee: Mitsubishi Chemical Industries Limited, Tokyo, Japan

[21] Appl. No.: 62,755

[22] Filed: Jun. 16, 1987

[30] Foreign Application Priority Data

Jun. 19, 1986 [JP] Japan .................................. 61-143442

[51] Int. Cl.$^4$ ........................................... C08F 226/02
[52] U.S. Cl. ............................... 526/307.2; 525/328.2; 526/303.1
[58] Field of Search .................. 525/328.2; 526/303.1, 526/307.2

[56] References Cited

U.S. PATENT DOCUMENTS

| 4,255,548 | 3/1981 | Wingard, Jr. et al. .......... 525/328.2 |
| 4,500,437 | 2/1985 | Engelhardt et al. ............ 526/307.2 |

FOREIGN PATENT DOCUMENTS

| 1271399 | 6/1968 | Fed. Rep. of Germany ... 526/307.7 |
| 1495692 | 5/1972 | Fed. Rep. of Germany ...... 526/303 |
| 3443461 | 5/1986 | Fed. Rep. of Germany ... 525/328.2 |
| 1051007 | 3/1986 | Japan ............................ 525/328.2 |
| 1141712 | 6/1986 | Japan ............................ 526/303.1 |
| 1190508 | 8/1986 | Japan ............................ 526/328.2 |

Primary Examiner—Joseph L. Schofer
Assistant Examiner—J. M. Reddick
Attorney, Agent, or Firm—David G. Conlin

[57] ABSTRACT

Disclosed herein is a vinylamine copolymer having the structural units represented by the general formulae (I), (II) and (III):

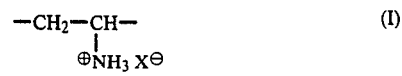

(wherein X represents an anion or hydroxyl ion)

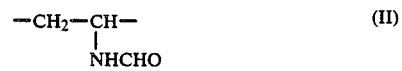

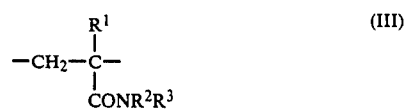

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, the molar fraction of the structural unit (II) is 5 to 85% by mole, and the molar fraction of the structural unit (III) is 90 to 5% by mole, a flocculating agent, a drainage aid and a paper strength increasing agent using such vinylamine copolymer, and a process for producing such vinylamine copolymer.

5 Claims, No Drawings 4,808,683

VINYLAMINE COPOLYMER, FLOCCULATING AGENT USING THE SAME, AND PROCESS FOR PREPARING THE SAME

BACKGROUND OF THE INVENTION

The present invention relates to a novel polyvinylamine copolymer having the excellent effect in use in the fields of application of cationic polymers, such as flocculating agent for the treatment of waste water, dehydrating agent for organic sludge, and drainage aid, retention aid, paper strength increasing agent, etc. in papermaking industry. More particularly, the invention relates to a vinylamine copolymer having the structural units represented by the following formulae (I), (II) and (III):

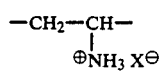  (I)

(wherein X represents an anion or hydroxyl ion)

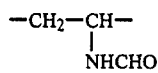  (II)

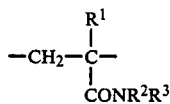  (III)

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms), in which the molar fraction of the structural unit (I) is 5 to 85% by mole, the molar fraction of the structural unit (II) is 5 to 85% by mole, and the molar fraction of the structural unit (III) is 90 to 5% by mole, a flocculating agent, a drainage aid and a paper strength increasing agent using such vinylamine copolymer, and a process for producing such vinylamine copolymer.

For the preparation of polyvinylamines, there have been known the methods by Hofmann degradation of polyacrylamides and hydrolysis of poly N-vinylamides. Especially, the method of hydrolysis of a single polymer of N-vinylformamides is an excellent method which is capable of synthesizing high-molecular weight polyvinylamines with high stability. However, the polymers obtained by this hydrolyzing method are very high in hydrophilicity and unsatisfactory in effect as a flocculating agent for dehydration. For solving such disadvantage, a method has been proposed in which, in order to afford hydrophobicity to the produced polyvinylamine, N-vinylformamide and ethylene are copolymerized and the resulting product is hydrolyzed. However, since N-vinylformamide and ethylene are not well copolymerizable with each other and incapable of producing a high-molecular weight copolymer, it was difficult to solve said problem by the copolymer of N-vinylformamide and ethylene. The present inventors had previously proposed a flocculating agent using the basic hydrolyzate of a copolymer of N-vinylformamide and N,N-dialkyl(meth)acrylamide [Japanese Patent Application Laid Open (Kokai) No. 61-118406 (1986)]. However, since this hydrolyzate becomes a tetrapolymer containing carboxyl groups, this product, when used as a flocculating agent for dehydration, was incapable of lowering the water content of dehydrated sludge.

As a result of further studies for providing an excellent flocculating agent for dehydration, it has been found by the present inventors that a polyvinylformamide copolymer which has been partially modified under an acidic condition, that is, a polymer comprising the structural units represented by the following general formulae (I), (II) and (III):

  (I)

(wherein X represents an anion or hydroxyl ion)

  (II)

  (III)

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms), in which the molar fraction of the structural unit (I) is 5 to 85% by mole, the molar fraction of the structural unit (II) is 5 to 85% by mole and the molar fraction of the structural unit (III) is 90 to 5% by mole, is a novel high-molecular weight vinylamine copolymer provided with hydrophobicity, and the present invention has been attained on the basis of this finding.

SUMMARY OF THE INVENTION

In a first aspect of the present invention, there is provided a vinylamine copolymer having the structural units represented by the general formulae (I), (II) and (III):

  (I)

(wherein X represents an anion or hydroxyl ion)

  (II)

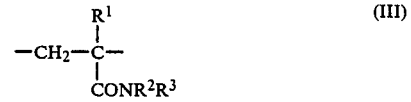  (III)

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, fraction of the structural unit (II) is to 85% by mole, and the molar fraction of the structural unit (III) is 90 to 5% by mole.

In a second aspect of the present invention, there is provided a flocculating agent comprising a vinylamine copolymer having the structural units represented by the general formulae (I), (II) and (III):

$$-CH_2-CH- \atop \overset{|}{\overset{\oplus}{N}H_3\ X^{\ominus}} \qquad (I)$$

(wherein X represents an anion or hydroxyl ion)

$$-CH_2-CH- \atop \overset{|}{NHCHO} \qquad (II)$$

$$-CH_2-\overset{R^1}{\underset{|}{\overset{|}{C}}}- \atop CONR^2R^3 \qquad (III)$$

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, the molar fraction of the structural unit (II) is 5 to 85% by mole, and the molar fraction of the structural unit (III) is 90 to 5% by mole.

In a third aspect of the present invention, there is provided a drainage aid comprising a vinylamine copolymer having the structural units represented by the general formulae (I), (II) and (III):

$$-CH_2-CH- \atop \overset{|}{\overset{\oplus}{N}H_3\ X^{\ominus}} \qquad (I)$$

(wherein X represents an anion or hydroxyl ion)

$$-CH_2-CH- \atop \overset{|}{NHCHO} \qquad (II)$$

$$-CH_2-\overset{R^1}{\underset{|}{\overset{|}{C}}}- \atop CONR^2R^3 \qquad (III)$$

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, the molar fraction of the structural unit (II) is 5 to 85% by mole, and the molar fraction of the structural unit (III) is 90 to 5% by mole.

In a fourth aspect of the present invention, there is provided a paper strength increasing agent comprising a vinylamine copolymer having the structural units represented by the general formulae (I), (II) and (III):

$$-CH_2-CH- \atop \overset{|}{\overset{\oplus}{N}H_3\ X^{\ominus}} \qquad (I)$$

(wherein X represents an anion or hydroxyl ion)

$$-CH_2-CH- \atop \overset{|}{NHCHO} \qquad (II)$$

$$-CH_2-\overset{R^1}{\underset{|}{\overset{|}{C}}}- \atop CONR^2R^3 \qquad (III)$$

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, the molar fraction of the structural unit (II) is 5 to 85% by mole, and the molar fraction of the structural unit (III) is 90 to 5% by mole.

In a fifth aspect of the present invention, there is provided a process for preparing a vinylamine copolymer having the structural units represented by the general formulae (I), (II) and (III):

$$-CH_2-CH- \atop \overset{|}{\overset{\oplus}{N}H_3\ X^{\ominus}} \qquad (I)$$

(wherein X represents an anion or hydroxyl ion)

$$-CH_2-CH- \atop \overset{|}{NHCHO} \qquad (II)$$

$$-CH_2-\overset{R^1}{\underset{|}{\overset{|}{C}}}- \atop CONR^2R^3 \qquad (III)$$

(wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms) in which the molar fraction of the structural unit (I) is 5 to 85% by mole, the molar fraction of the structural unit (II) is 5 to 85% by mole and the molar fraction of the structural unit (III) is 90 to 5% by mole, which process comprises polymerizing a 10:90–95:5 (by mole) mixture of N-vinylformamide and a compound of the formula (IV):

$$CH_2=\overset{R^1}{\underset{|}{C}} \atop CONR^2R^3 \qquad (IV)$$

(wherein $R^1$ represents hydrogen atom or a methyl group, $R^2$ represents hydrogen atom or an alkyl group having 1 to 4 carbon atoms and $R^3$ represents an alkyl group having 1 to 4 carbon atoms or an oxoalkyl group having 4 to 8 carbon atoms) in the presence of a radical polymerization initiator, and modifying the formyl group in the resulting polymer under an acidic condition.

DETAILED DESCRIPTION OF THE INVENTION

The copolymer of the present invention has the composition in which the molar fractions of the structural units (I), (II) and (III) are 5 to 85% by mole, 5 to 85% by mole and 90 to 5% by mole, respectively, preferably 5 to 85% by mole, 5 to 85% by mole and 60 to 10% by mole, respectively, more preferably 5 to 85% by mole, 5 to 85% by mole and 40 to 10% by mole, respectively.

The novel N-vinylamine copolymer of the present invention is a water-soluble polymer having a reduced viscosity of 0.1 to 10 dl/g, preferably 0.5 to 10 dl/g, measured as a solution thereof prepared by dissolving the copolymer in a 1N saline solution to a concentration of 0.1 g/dl, at 25° C.

The novel vinylamine copolymer of the present invention can be easily obtained by modifying the formyl group in the N-vinylformamide copolymer under an acidic condition. The starting N-vinylformamide copolymer is a copolymer obtainable by polymerizing a mixture of N-vinylformamide and a compound of the formula (IV):

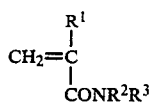  (IV)

(wherein $R^1$, $R^2$ and $R^3$ are the same as defined above.) which is a starting material of the structural unit of the formula (III), in a olar ratio of 10:90 to 95:5, preferably 40:60 to 95:5, more preferably 60:40 to 90:10, in the presence of a radical polymerization initiator.

As the N-substituted acrylamide or N-substituted methacrylamide of the formula (IV), there can be used the compounds of the formula (IV) in which $R^1$ is hydrogen atom or a methyl group, $R^2$ is hydrogen atom or an alkyl group having 1 to 4 carbon atoms and $R^3$ is an alkyl group having 1 to 4 carbon atoms or an oxoalkyl group having 4 to 8 carbon atoms. Examples of such compounds are N-methylacrylamide, N-ethylacrylamide, N-n-propylacrylamide, N-isopropylacrylamide, N-n-butylacrylamide, N-isobutylacrylamide, N-t-butylacrylamide, N,N-dimethylacrylamide, N,N-diethylacrylamide, N,N-di-n-propylacrylamide, N,N-di-n-butylacrylamide, N-(1,1-dimethyl-3-oxobutyl)acrylamide, N-methylmethacrylamide, N-ethylmethacrylamide, N-n-propylmethacrylamide, N-isopropylmethacrylamide, N-n-butylmethacrylamide, N-isobutylmethacrylamide, N-t-butylmethacrylamide, N,N-dimethylmethacrylamide, N,N-diethylmethacrylamide, N,N-di-n-propylmethacrylamide, N,N-di-n-butylmethacrylamide, N-(1,1-dimethyl-3-oxobutyl)methacrylamide and the like. Especially preferred among them are N-isopropylacrylamide, N-t-butylacrylamide, N,N-dimethylacrylamide and N-(1,1-dimethyl-3-oxobutyl)acrylamide.

As the polymerization method for producing the N-vinylformamide copolymer, there can be used mass polymerization, precipitation polymerization or solution polymerization, and solution polymerization is preferred. Aqueous solution polymerization is especially preferred. In case of using the aqueous solution polymerization method, the monomer concentration, polymerization method and polymerizing apparatus are properly selected by taking into consideration the molecular weight of the objective polymer and calorific control from heat of polymerization. For example, the polymerization can be accomplished by the following methods: (1) the mixture of starting materials is polymerized in a state of solution with a monomer concentration of 5 to 20% by weight; (2) the mixture is polymerized in a state of hydrous gel with a monomer concentration of 20 to 60% by weight; (3) an aqueous solution of the mixture with a monomer concentration of 20 to 60% by weight is polymerized in a state of oil-in-water or water-in-oil type emulsion by using a hydrophobic solvent and an emulsifier; and (4) an aqueous solution of the mixture with a monomer concentration of 20 to 60% by weight is polymerized in a state of water-in-oil type dispersion by using a hydrophobic solvent and a dispersion stabilizer.

As the radical polymerization initiator, there can be used any of the ordinary initiators which are commonly used for the polymerization of water-soluble or hydrophilic monomers, and the azo compounds are preferred for producing the polymer in a high yield. Especially preferred are the water-soluble azo compounds, for example, hydrochlorides and acetates of 2,2'-azobis-2-amidinopropane; sodium salt of 4,4'-azobis-4-cyanovaleric acid; and hydrochlorides and sulfates of azobis-N,N'-dimethylene-isobutylamidine. Such polymerization initiator is used in an amount of usually 0.01 to 1% by weight based on the monomer weight. The polymerization reaction is usually carried out under an inert gas stream at a temperature of 30° to 100° C.

The obtained N-vinylformamide copolymer is modified in the form as it is, a dilute solution of the polymer or a powder obtained by dehydrating or drying the polymer in a known way under an acidic condition, whereby a novel polyvinylamine can be obtained.

For the modification, there can be employed, for example, the following methods: (1) acid hydrolysis is carried out in water; (2) acid hydrolysis is conducted in a hydrophilic solvent such as alcohol containing water; (3) alcohol-addition degradation is conducted under an acidic condition. It is preferred to use a method in which modification is accomplished while separating the formyl group as an ester of formic acid. The modification reaction of the structural unit of the formula (III) is controlled by these methods to produce a vinylamine copolymer substantially free of carboxyl groups. As the modifying agent used for this acidic modification, any of the compounds acting with strong acidity can be employed, the examples of such compounds including hydrochloric acid, bromic acid, hydrofluoric acid, sulfuric acid, nitric acid, phosphoric acid, sulfamic acid, alkane-sulfonic acid and the like. The amount of such modifying agent used is selected from within the range of 0.1 to 2 times to the molar quantity of formyl groups in the polymer according to the desired rate of modification. The alcohol used in the said alcohol-addition degradation is selected from those having 1 to 4 carbon atoms, and methanol is preferred.

The vinylamine copolymer of the present invention shows particularly excellent effect as a cationic flocculating agent for flocculating organic suspended solids in treatment of waste water or as a flocculating agent for dehydrating organic sludge. It proves particularly effective in use as a dehydrating flocculating agent for primary settled raw sludge in the treatment of sewage, or sludge produced in the active sludge treatment or anaerobic treatment of water-soluble organic matter, or mixtures thereof. As for the way of use of the said copolymer, it can be used in the same way as the conventional cationic flocculants such as polymers of dimethylaminoethyl methacrylate. Typically, it is used in the form of a 0.1 to 0.5% by weight aqueous solution, and it is added and mixed in an organic sludge-containing suspension in an amount of 20 to 20,000 ppm based on the weight of the said suspension.

The novel polyvinylamine of the present invention obtained by modifying an N-vinylformamide copolymer, when used as a flocculating agent, is preferably a water-soluble polymer having a reduced viscosity of 1 to 10 dl/g measured as a 0.1 g/dl 1N saline solution thereof at 25° C. The organic sludge subjected to a flocculating treatment by using the vinylamine copolymer of the present invention is formed into more firm and solid flocks than when using a polymer obtained by modifying a homopolymer of N-vinylformamide, so that when the said flocks are subjected to mechanical dehydration such as compression dehydration, centrifuging, vacuum filtration, etc., by use of belt press, screw press, filter press, etc., the dehydration treating speed is improved, the throughput rate is increased, and the water content of the dehydrated sludge is reduced.

The novel polyvinylamine of the present invention obtained by modifying N-vinylformamide copolymer is also useful as a cationic water-soluble polymer in papermaking industry and exhibits excellent effect in use as a freeness improving agent, filler retention improving agent and paper strength increasing agent. In use of the compound of the present invention for the said purposes, the water-soluble polymer having a reduced viscosity of 0.5 to 10 dl/g measured as a 0.1 g/dl 1N saline solution thereof at 25° C. is preferred.

As for the way of use thereof, it can be used in any of the known papermaking methods. For instance, the cationic polymer of an amount equivalent to 0.05 to 2% by weight based on dry weight of pulp is added into a pulp slurry containing 1 to 3% by weight of pulp in the form of a 0.1 to 5% by weight aqueous solution, and the mixture is subjected to a papermaking process. Particularly when the polymer is used as a paper strength increasing agent, it may be added to pulp slurry as an internal additive, or it may be coated on wet or dry web by using a roll coater, size press or dipping machine. If necessary, cationic starch, aluminum sulfate or anionic polyacrylamide increasing agent may be used jointly with the polymer of the present invention. The type of pulp with which the polymer of the present invention is usable is not limited. The polymer is usable with all types of pulp including ground pulp, sulfide pulp, kraft pulp as well as beaten wastepaper.

The cationic polymer of the present invention is very stable in the form of an aqueous solution regardless of the quality of the solution in which the polymer is dissolved. It is stable even in the form of a dilute solution. Further, the polymer remains stable and doesn't lose its effect even under the weakly alkaline papermaking conditions using calcium carbonate as pigment or filler. It can serve as an additive which shows excellent effect under the neutral or weakly alkaline papermaking conditions.

The novel high-molecular weight polyvinylamine having hydrophobicity of the present invention contributes greatly to the fields of application of flocculating agent and additives for papermaking.

The present invention will hereinafter be described more particularly according to the examples thereof, but the invention is not to be limited in its scope by the following examples but can be embodied otherwise without departing from the claimed scope and spirit of the invention.

EXAMPLE 1

(Preparation of Vinylamine copolymer)

8.76 g N-vinylformamide, 11.24 g of N-(1,1-dimethyl-3-oxobutyl)acrylamide and 29.8 g of demineralized water were supplied into a 200 ml four-necked flask provided with a stirrer, a nitrogen feed pipe and a condenser. The mixture was heated to 60° C. under stirring in a nitrogen gas stream and then added with 0.2 g of a 10% by weight 2,2'- azobis-2-amidinopropane dihydrochloride solution. Thereafter, stirring was stopped and the mixture was maintained at 50° C. for 5 hours. 1 g of the resulting hydrous gel-like product was dehydrated and precipitated in 20 ml of acetone, and the precipitate was dried in vacua to obtain a solid-state polymer. The remaining monomer in acetone used for dehydration was analyzed by liquid chromatography to determine the conversion of monomers and structure of the obtained polymer. The results are shown in Table 1.

The hydrous gel of the thus obtained polymer was crushed into particles of about 0.5 mm in diameter, and 10 g thereof was put into a 50 ml reactor provided with a stirrer and a condenser together with 20 g of methanol. The mixture was further added with 2.6 g of 35% hydrochloric acid under stirring and reacted by refluxing under heating for 4 to 6 hours. The resulting product was dehydrated with acetone and dried in vacuo. The reduced viscosity and modification rate (composition of the modified product) of the thus obtained powdery water-soluble polymer (hereinafter referred to as polymer A) were determined by the methods shown below. The results are shown in Table 2.

Determination of reduced viscosity

The solid-state polymer was dissolved in a 1N saline solution to a concentration of 0.1 g/dl, and the reduced viscosity thereof at 25° was measured by using an Ostwald's viscometer.

Reduced viscosity $(dl/g) = (t - t_0)/t_0/0.1$ (wherein $t_0$ represents descending speed of saline solution, and $t$ represents descending speed of polymer solution.)

Determination of modification rate

The solid-state polymer was dissolved in distilled water to a concentration of 0.1% by weight. 0.5 g of this solution was diluted to 200 ml by using desalted water, and after adjusting the pH of the solution to 3 with dilute hydrochloric acid, the resultant solution was subjected to colloidal titration with toluidine blue as indicator by using 1/400N potassium polyvinylsulfate to calculate the modification rate of formyl group from the equivalent of formed cationic group.

EXAMPLES 2–7

Polymerization was carried out by using the comonomers of the types and molar fractions shown in Table 1 instead of N-(1,1-dimethyl-3-oxobutyl) acrylamide of Example 1 and with the monomer concentrations shown in Table 1. The resulting polymers were modified in the same way as Example 1 to obtain the water-soluble polymers (these polymers being hereinafter referred to as polymers B–G, respectively). The polymerization rates are shown in Table 1. Also, the reduced viscosity and modification rate (composition of modified product) of each of the obtained water-soluble polymers were determined in the same way as Example 1. The results are shown in Table 2.

TABLE 1

| Example No. | Comonomer Type | Molar fraction | Monomer concentration (wt %) | Conversion of monomers (%) |
| --- | --- | --- | --- | --- |
| 1 | DAAM[1] | 0.35 | 40 | 90 |
| 2 | DAAM | 0.50 | 50 | 97 |
| 3 | DAAM | 0.20 | 50 | 98 |
| 4 | DMAM[2] | 0.10 | 60 | 99 |
| 5 | DMAM | 0.30 | 60 | 100 |
| 6 | IPAM[3] | 0.20 | 50 | 100 |
| 7 | IPAM | 0.35 | 50 | 98 |

(Note)
[1]DAAM: N—(1,1-dimethyl-3-oxobutyl)acrylamide
[2]DMAM: N,N—dimethylacrylamide
[3]IPAM: N—isopropylacrylamide

TABLE 2

| Example No. | Polymer | Structural unit (mol %) I | II | III[1] | Reduced viscosity (dl/g) |
| --- | --- | --- | --- | --- | --- |
| 1 | A | 29 | 35 | 36 | 2.6 |
| 2 | B | 35 | 14 | 51 | 1.0 |
| 3 | C | 41 | 39 | 20 | 6.5 |
| 4 | D | 81 | 9 | 10 | 3.7 |
| 5 | E | 55 | 15 | 30 | 2.2 |
| 6 | F | 57 | 23 | 20 | 6.5 |
| 7 | G | 37 | 28 | 35 | 4.8 |

(Note)
[1]Structural unit (III) indicates the structural unit of the polymer of each starting monomer shown in Table 1.

EXAMPLES 8-14 & COMPARATIVE EXAMPLES 1-3

(Flocculating property)

100 ml (2.0% by weight in solid content) of mixed raw sludge in a sewage treatment plant of A city was put into a 200 ml polyethylene-made beaker, and then 5 ml of each of the polymers A-G produced in the above-shown Examples and the polymers H-J shown in Table 3 was supplied into said beaker in the form of a 0.2 wt % aqueous solution. The mixture was stirred by a stirrer having at its end three rods of 5 mm in diameter and 20 mm in length at a speed of 1,000 r.p.m. for 10 seconds. The flocculated sludge was put into a cylinder bottomed with a 60-mesh nylon screen having a diameter of 65 mm and subjected to gravity filtration, and after 10 seconds, the amount of the filtrate was measured. The gravity-filtered sludge was then put into a centrifuging basket having a dish drainer at its bottom and centrifuged at a speed of 3,000 r.p.m. for dehydration. After dehydration, the sludge was dried at 110° C. for 6 hours, and by measuring the solid content, the water content of the sludge after centrifuging dehydration was calculated. The results are shown in Table 3.

TABLE 3

| | Polymer | Amount of filtrate after 10 seconds of gravity filtration (ml) | Water content of sludge after centrifuging dehydration (wt %) |
| --- | --- | --- | --- |
| EXAMPLE | | | |
| 8 | A | 60 | 86.8 |
| 9 | B | 54 | 87.3 |
| 10 | C | 65 | 86.2 |

TABLE 3-continued

| | Polymer | Amount of filtrate after 10 seconds of gravity filtration (ml) | Water content of sludge after centrifuging dehydration (wt %) |
| --- | --- | --- | --- |
| 11 | D | 47 | 87.7 |
| 12 | E | 51 | 87.1 |
| 13 | F | 66 | 85.9 |
| 14 | G | 63 | 86.1 |
| COMPARATIVE EXAMPLE | | | |
| 1 | H[1] | 41 | 89.8 |
| 2 | I[2] | Not flocculated | — |
| 3 | J[3] | 43 | 89.9 |

(Notes)
[1]Polymer H: poly-2-methacryloyloxyethyltrimethyl-ammonium chloride (reduced viscosity: 4.5 dl/g)
[2]Polymer I: N—vinylformamide/ethylene (56/44 by molar ratio (copolymer hydrolyzate (modification rate: 59% by mole)
[3]Polymer J: Product of basic hydrolysis of N—vinylformamide copolymer of Example 6 in water (modification rate: 68% by mole)

EXAMPLES 15-17 & COMPARATIVE EXAMPLES 4 and 5

(Paper strength increasing effect)

1% slurry of LBKP having a freeness of 435 ml as measured according to the Canadian Standard was put into a 500 ml beaker, and then each of the polymers C, E, G and I was supplied into the beaker under stirring, in the form of a 1% by weight aqueous solution, in an amount of 0.4% by weight based on dry weight of the pulp. The resultant mixture was maintained for one minute. By using this mixture, papers with a basis weight of 60 g were made by using a TAPPI (Technical Association of the Paper and Pulp Industry) standard square type paper making machine. By way of comparison, papers were similarly made without adding any polymer.

The obtained wet papers were dried by a 120° C. drum dryer for 3 minutes, and the formed papers were left under the conditions of 20° C. and 60% RH. The specific burst factor and burst length of the papers were measured according to JIS-P8112 and JIS-P8113.

$$\text{Specific burst factor} = \frac{S_1}{W} \times 100 \ (kg/cm^2)$$

$$\text{Burst length} = \frac{S_2}{B \times W} \times 1,000 \ (km)$$

$S_1$: burst strength (kg/cm$^2$)
W : basis weight of test paper (g/m$^2$)
$S_2$: tensile strength (kg)
B : width of test piece (mm)
The results are shown in Table 4.

TABLE 4

| | Polymer | Burst factor (kg/cm$^2$) | Burst length (km) |
| --- | --- | --- | --- |
| Example | | | |
| 15 | C | 2.29 | 4.11 |
| 16 | E | 2.54 | 4.59 |
| 17 | G | 2.33 | 4.33 |
| Comparative Example | | | |
| 4 | I | 2.00 | 3.59 |
| 5 | No polymer added | 2.06 | 3.85 |

EXAMPLES 18–20 & COMPARATIVE EXAMPLE 6

(Drainage aid effect) 1 liter of 0.3% slurry of LBKP (Leaf Bleaching Kraft Pulp) having a freeness of 220 ml as measured according to the Candian Standard was put into a 2-liter beaker, and each of the polymers C, E and G was supplied into the beaker under stirring, in the form of a 0.2% by weight aqueous solution, in an amount of 0.2% by weight based on dry weight of the pulp. After stirring the mixture at a speed of 200 r.p.m. for one minute, the freeness of each product was measured by using a Canadian standard freeness tester. For the purpose of comparison, a same experiment was conducted without adding any polymer. The results are shown in Table 5.

TABLE 5

| | Polymer | Freeness (ml) |
|---|---|---|
| Example | | |
| 18 | C | 373 |
| 19 | E | 257 |
| 20 | G | 272 |
| Comparative Example 6 | No polymer added | 220 |

What is claimed is:

1. A vinylamine copolymer having the structural units represented by the general formulae (I), (II) and (III):

 (I)

wherein X represents an anion or hydroxyl ion

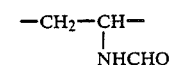 (II)

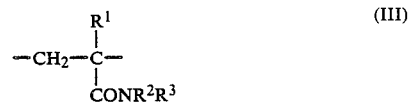 (III)

wherein $R^1$ represents hydrogen atom or a methyl group, $R^2$ represents hydrogen atom or an alkyl group having 1 to 4 carbon atoms, and $R^3$ represents an alkyl group having 1 to 4 carbon atoms or an oxoalkyl group having 4 to 8 carbon atoms in which the molar fraction of the structural unit (I) is 5 to 85% by mole, the molar fraction of the structural unit (II) is 5 to 85% by mole, and the molar fraction of the structural unit (III) is 90 to 5% by mole.

2. A vinylamine copolymer according to claim 1, wherein the molar fraction of the structural unit (I) is 5 to 85% by mole, the molar fraction of the structural unit (II) is 5 to 85% by mole, and the molar fraction of the structural unit (III) is 60 to 10% by mole.

3. A vinylamine copolymer according to claim 2, wherein the molar fraction of the structural unit (I) is 5 to 85% by mole, the molar fraction of the structural unit (II) is 5 to 85% by mole, and the molar fraction of the structural unit (III) is 40 to 10% by mole.

4. A vinylamine copolymer according to claim 1, having a reduced viscosity of 0.1 to 10 dl/g measured as a solution thereof prepared by dissolving said copolymer in a 1N saline solution to a concentration of 0.1 g/dl, at 25° C.

5. A vinylamine copolymer according to claim 4, wherein the reduced viscosity of said vinylamine copolymer is 0.5 to 10 dl/g.

* * * * *